United States Patent
Fargo et al.

(10) Patent No.: US 10,906,782 B2
(45) Date of Patent: Feb. 2, 2021

(54) PASSIVE ELEVATOR CAR

(71) Applicant: OTIS ELEVATOR COMPANY, Farmington, CT (US)

(72) Inventors: Richard N. Fargo, Plainville, CT (US); Daryl J. Marvin, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 179 days.

(21) Appl. No.: 15/544,817

(22) PCT Filed: Jan. 18, 2016

(86) PCT No.: PCT/US2016/013788
§ 371 (c)(1),
(2) Date: Jul. 19, 2017

(87) PCT Pub. No.: WO2016/118446
PCT Pub. Date: Jul. 28, 2016

(65) Prior Publication Data
US 2018/0009638 A1 Jan. 11, 2018

Related U.S. Application Data

(60) Provisional application No. 62/105,382, filed on Jan. 20, 2015.

(51) Int. Cl.
*B66B 13/14* (2006.01)
*B66B 11/02* (2006.01)
(Continued)

(52) U.S. Cl.
CPC .............. *B66B 13/143* (2013.01); *B66B 1/28* (2013.01); *B66B 1/34* (2013.01); *B66B 5/0031* (2013.01);
(Continued)

(58) Field of Classification Search
CPC .... B66B 11/0233; B66B 11/024; B66B 13/12
See application file for complete search history.

(56) References Cited

U.S. PATENT DOCUMENTS 4,592,270 A * 6/1986 Vener ................... A62C 3/04
187/414
7,077,244 B2 * 7/2006 Oh ......................... B66B 1/40
187/394

(Continued)

FOREIGN PATENT DOCUMENTS

CN 1458901 A 11/2003
CN 101065315 A 10/2007
(Continued)

OTHER PUBLICATIONS

Machine translation of CN 203284020 to Liu.*
(Continued)

*Primary Examiner* — Diem M Tran
(74) *Attorney, Agent, or Firm* — Cantor Colburn LLP

(57) ABSTRACT

An elevator system includes a hoistway and an elevator car positioned in the hoistway and configured to travel along the hoistway. The elevator car includes an elevator car door. A door operator assembly is fixed in the hoistway at a landing floor and includes a sensor to sense presence of the elevator car at the landing floor; and a door operator mechanism to open both the elevator car door and a landing floor door when the sensor senses presence of the elevator car at the landing floor. A light source may be fixed at the hoistway and a light transmitter is positioned at the elevator car to gather light from the light source and output the light into an interior of the elevator car. A ventilation system may be fixed at the hoistway and is interactive with the elevator car to condition an interior of the elevator car.

8 Claims, 3 Drawing Sheets

(51) Int. Cl.
*B66B 1/34* (2006.01)
*B66B 1/28* (2006.01)
*B66B 5/00* (2006.01)
*B66B 9/00* (2006.01)
*B66B 13/12* (2006.01)
*F21V 8/00* (2006.01)
*B66B 11/04* (2006.01)

(52) U.S. Cl.
CPC .............. *B66B 9/00* (2013.01); *B66B 11/024* (2013.01); *B66B 11/0233* (2013.01); *B66B 13/12* (2013.01); *G02B 6/0008* (2013.01); *B66B 9/003* (2013.01); *B66B 11/0407* (2013.01); *Y02B 50/00* (2013.01)

(56) References Cited

U.S. PATENT DOCUMENTS

| | | | | |
|---|---|---|---|---|
| 7,350,625 | B2 * | 4/2008 | Deplazes | B66B 13/22 |
| | | | | 187/393 |
| 2001/0035828 | A1 * | 11/2001 | Rossignol | B66B 1/3492 |
| | | | | 340/686.1 |
| 2005/0034931 | A1 | 2/2005 | Deplazes et al. | |
| 2005/0098390 | A1 * | 5/2005 | Angst | B66B 5/0018 |
| | | | | 187/391 |
| 2007/0084672 | A1 | 4/2007 | Helmle et al. | |

FOREIGN PATENT DOCUMENTS

| | | | |
|---|---|---|---|
| CN | 100522786 | C | 8/2009 |
| CN | 202107411 | U | 1/2012 |
| CN | 102556801 | A | 7/2012 |
| CN | 203284020 | U * | 11/2013 |
| CN | 203395807 | U * | 1/2014 |
| EP | 0241610 | A1 | 10/1987 |

OTHER PUBLICATIONS

International Search Report and Written Opinion; International Application No. PCT/US2016/013788; International Filing Date: Jan. 18, 2016; dated Jul. 18, 2016; 15 pages.
Chinese Office Action for Chinese Application No. 201680006526.8, dated Jan. 9, 2020, 10 pages.
Chinese Office Action Issued in CN Application No. 201680006526.8, dated Aug. 1, 2019, 10 Pages.

* cited by examiner

PASSIVE ELEVATOR CAR

CROSS-REFERENCE TO RELATED APPLICATIONS

This application is a National Stage application of PCT/US2016/013788 filed on Jan. 18, 2016, which claims the benefit of U.S. Provisional Application No. 62/105,382, filed Jan. 20, 2015, which are incorporated herein by reference in their entirety.

BACKGROUND

The subject matter disclosed herein relates generally to the field of elevators, and more particularly to a multicar, ropeless elevator system.

Ropeless elevator systems, also referred to as self-propelled elevator systems, are useful in certain applications (e.g., high rise buildings) where the mass of the ropes for a roped system is prohibitive and there is a desire for multiple elevator cars to travel in a single lane. There exist ropeless elevator systems in which a first lane is designated for upward traveling elevator cars and a second lane is designated for downward traveling elevator cars. A transfer station at each end of the hoistway is used to move cars horizontally between the first lane and second lane.

In a typical elevator system, elevator cars provide several features including interior lighting, forced ventilation, and automatic doors, which all add weight to the car, and consume power. In such elevator systems, the necessary electrical power is provided by a traveling cable operably connecting a power source to the elevator car. Ropeless elevators, however, do not have a traveling cable, thus electrical power is power is typically provided to cars in a ropeless elevator system by a battery in the elevator car during many phases of operation. In addition, since ropeless elevator systems do not have counterweights, any weight of these features, and a battery in the elevator car all result in an increase in size and cost of the propulsion system for the elevator system.

BRIEF SUMMARY

In one embodiment, an elevator system includes a hoistway and an elevator car positioned in the hoistway and configured to travel along the hoistway. The elevator car includes an elevator car door. A door operator assembly is fixed in the hoistway at a landing floor and includes a sensor to sense presence of the elevator car at the landing floor; and a door operator mechanism to open both the elevator car door and a landing floor door when the sensor senses presence of the elevator car at the landing floor.

Alternatively or additionally, in this or other embodiments the sensor is a radio frequency identification or optical sensor.

Alternatively or additionally, in this or other embodiments the door operator is inoperable when the sensor does not sense the presence of the elevator car at the landing floor.

Alternatively or additionally, in this or other embodiments a light source is fixed at the hoistway and a light transmitter is positioned at the elevator car to gather light from the light source and output the light into an interior of the elevator car.

Alternatively or additionally, in this or other embodiments the light transmitter is a light pipe including a light pipe inlet located proximate to the light source and a light pipe outlet located at the elevator car to output light into the interior of the elevator car.

Alternatively or additionally, in this or other embodiments the light source is one or more light emitting diodes arranged along the hoistway.

Alternatively or additionally, in this or other embodiments a ventilation system is fixed at the hoistway and is operably connected with the elevator car to condition an interior of the elevator car.

Alternatively or additionally, in this or other embodiments the ventilation system includes an air outlet in flow communication with a car air inlet to urge a conditioned airflow from the ventilation system into the elevator car via the car air inlet.

Alternatively or additionally, in this or other embodiments the air outlet is located at a landing floor.

Alternatively or additionally, in this or other embodiments the elevator system is a ropeless elevator system.

In another embodiment, an elevator system includes a hoistway and an elevator car located in the hoistway and configured to travel along the hoistway. A light source is fixed at the hoistway and a light transmitter is positioned at the elevator car to gather light from the light source and output the light into an interior of the elevator car.

Alternatively or additionally, in this or other embodiments the light transmitter is a light pipe including a light pipe inlet located proximate to the light source and a light pipe outlet located at the elevator car to output light into the interior of the elevator car.

Alternatively or additionally, in this or other embodiments the light source is one or more light emitting diodes arranged along the hoistway.

Alternatively or additionally, in this or other embodiments the light source is turned on only when an elevator car is adjacent to the light source.

Alternatively or additionally, in this or other embodiments the elevator system is a ropeless elevator system.

In yet another embodiment, an elevator system includes a hoistway and an elevator car positioned in the hoistway and configured to travel along the hoistway. A ventilation system is fixed at the hoistway and is operably connected with the elevator car to condition an interior of the elevator car.

Alternatively or additionally, in this or other embodiments the ventilation system includes an air outlet in flow communication with a car air inlet to urge a conditioned airflow from the ventilation system into the elevator car via the car air inlet.

Alternatively or additionally, in this or other embodiments the air outlet is located at a landing floor.

Alternatively or additionally, in this or other embodiments a volume of phase change material is located at the elevator car to condition the interior of the elevator car. The ventilation system is interactive with the phase change material to charge the phase change material.

Alternatively or additionally, in this or other embodiments the elevator system is a ropeless elevator system.

The detailed description explains the invention, together with advantages and features, by way of examples with reference to the drawings.

DETAILED DESCRIPTION

Figure 1:
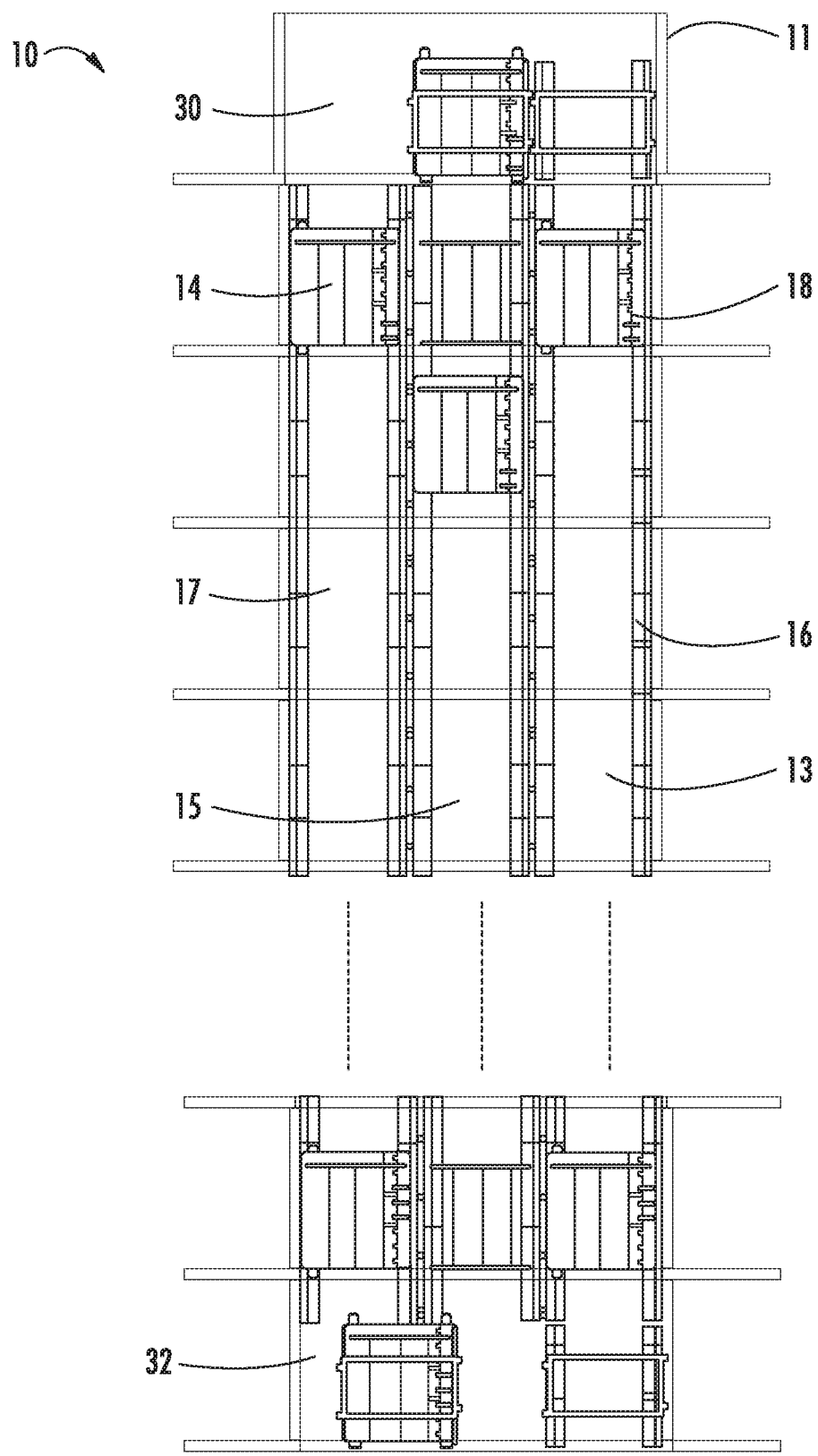
FIG. 1 depicts a multicar elevator system in an exemplary embodiment.

FIG. 1 depicts a multicar, ropeless elevator system 10 in an exemplary embodiment. Elevator system 10 includes a hoistway 11 having a plurality of lanes 13, 15 and 17. While three lanes are shown in FIG. 1, it is understood that embodiments may be used with multicar, ropeless elevator systems have any number of lanes. In each lane 13, 15, 17, cars 14 travel in one direction, i.e., up or down. For example, in FIG. 1 cars 14 in lanes 13 and 15 travel up and cars 14 in lane 17 travel down. One or more cars 14 may travel in a single lane 13, 15, and 17.

Above the top floor is an upper transfer station 30 to impart horizontal motion to elevator cars 14 to move elevator cars 14 between lanes 13, 15 and 17. It is understood that upper transfer station 30 may be located at the top floor, rather than above the top floor. Below the first floor is a lower transfer station 32 to impart horizontal motion to elevator cars 14 to move elevator cars 14 between lanes 13, 15 and 17. It is understood that lower transfer station 32 may be located at the first floor, rather than below the first floor. Although not shown in FIG. 1, one or more intermediate transfer stations may be used between the first floor and the top floor. Intermediate transfer stations are similar to the upper transfer station 30 and lower transfer station 32.

Cars 14 are propelled using a linear motor system having a primary, fixed portion 16 and a secondary, moving portion 18. The primary portion 16 includes windings or coils mounted at one or both sides of the lanes 13, 15 and 17. Secondary portion 18 includes permanent magnets mounted to one or both sides of cars 14. Primary portion 16 is supplied with drive signals to control movement of cars 14 in their respective lanes along rails 12 extending along the hoistway 11.

Figure 2:
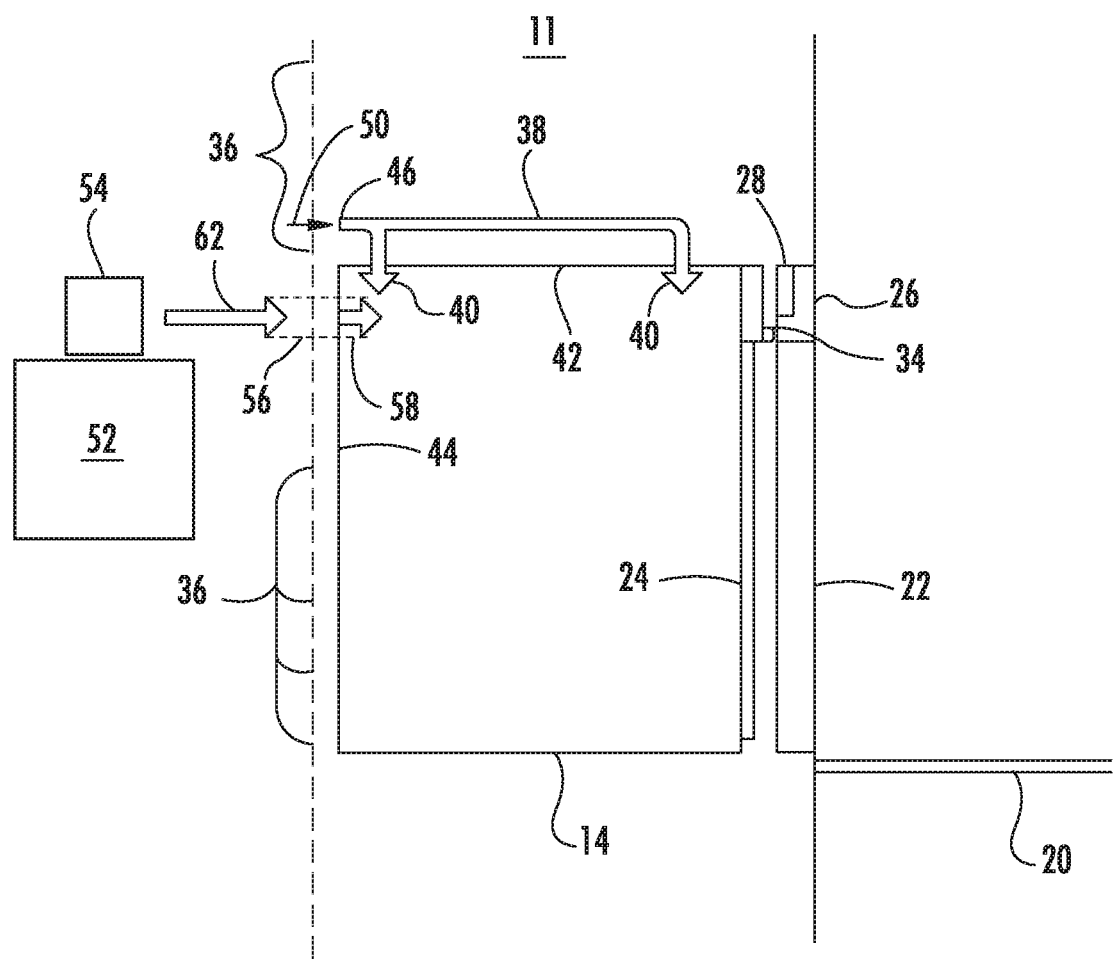
FIG. 2 depicts an embodiment of an elevator car for an elevator system.

Referring now to FIG. 2, an exemplary embodiment of an elevator car 14 is illustrated. The elevator car 14 is configured to reduce weight and electrical power consumption of the car 14, by moving traditional components of the car off of the car 14. At each landing floor 20 of a building in which the elevator system 10 is installed, there is a landing door 22 to allow ingress and egress of passengers to and from the elevator car 14. Further, an elevator car door 24 is opened and closed in sync with the landing door 22, and in the closed position encloses the passengers in the elevator car 14 when the car 14 is in motion. For passenger safety, the landing door 22 is normally operational only when a car 14 is present at the landing floor 20. In a traditional elevator system, a door operating mechanism is located on the elevator car, and when the car arrives at a landing floor, the operating mechanism opens both the elevator car door and the landing door, via a mechanical link between the components. In the embodiment of FIG. 2, a door operator 26, which is electrically powered, is located at the landing floor 20. When the elevator car 14 arrives at and stops at the landing floor 20 a sensor 28 at the landing floor 20 detects the presence of the elevator car 14 via, for example radio frequency identification (RFID) or optical sensing, and engages a link 34 between the door operator 26 and the car door 24. Alternatively, the sensor may be an extendable physical contact, which must pass an electrical current through a feature on the elevator car 14 in order to enable the door operator 26 to open the car door 24. The door operator 26 then proceeds to open the car door 24 and the landing door 22. Without positively sensing the presence of the elevator car 14 at the landing floor 20, the door operator 26 is inoperable thus preventing opening of the landing door 22.

Another electrically-powered component included in a typical elevator car is in-car lighting. The configuration of FIG. 2, in another exemplary embodiment, removes the electrically-powered lighting off of elevator car 14, and instead provides car lighting via a light source 36 in the hoistway 11 and a passive light pipe 38 at the elevator car 14. In some embodiments, the light source 36 is a plurality of light emitting diode (LED) lights affixed along the hoistway 11. LED lights are advantageous as they have low electrical power requirements, but one skilled in the art will recognize that other light sources 36, for example, incandescent lights and/or natural light provided in the hoistway via a skylight or other opening may be utilized as a light source 36. One or more light pipes 38, or other light transmission mechanism, are arranged at the car 14, with each light pipe 38 having an outlet 40 at, for example, a ceiling 42 or sidewall 44 of the elevator car 14. The light pipe 38 has an inlet 46 located to be proximate to the light source 36 as the elevator car 14 travels along the hoistway 11. In some embodiments, a single inlet 46 leads to multiple outlets 40, while in other embodiments each inlet 46 leads to a single outlet 40. As the car 14 travels along the hoistway 11, the light pipes 38 gather light 50 from the light sources 36 at the inlet 46, and emit the light 50 at the outlets 40 into an interior of the car 14. In some embodiments, the light 36, such as the plurality of LEDs, are only turned on when an elevator car 14 is adjacent to the particular light 36, thus reducing power consumption further. After the elevator car 14 passes, the light 36 is turned off.

Figure 3:
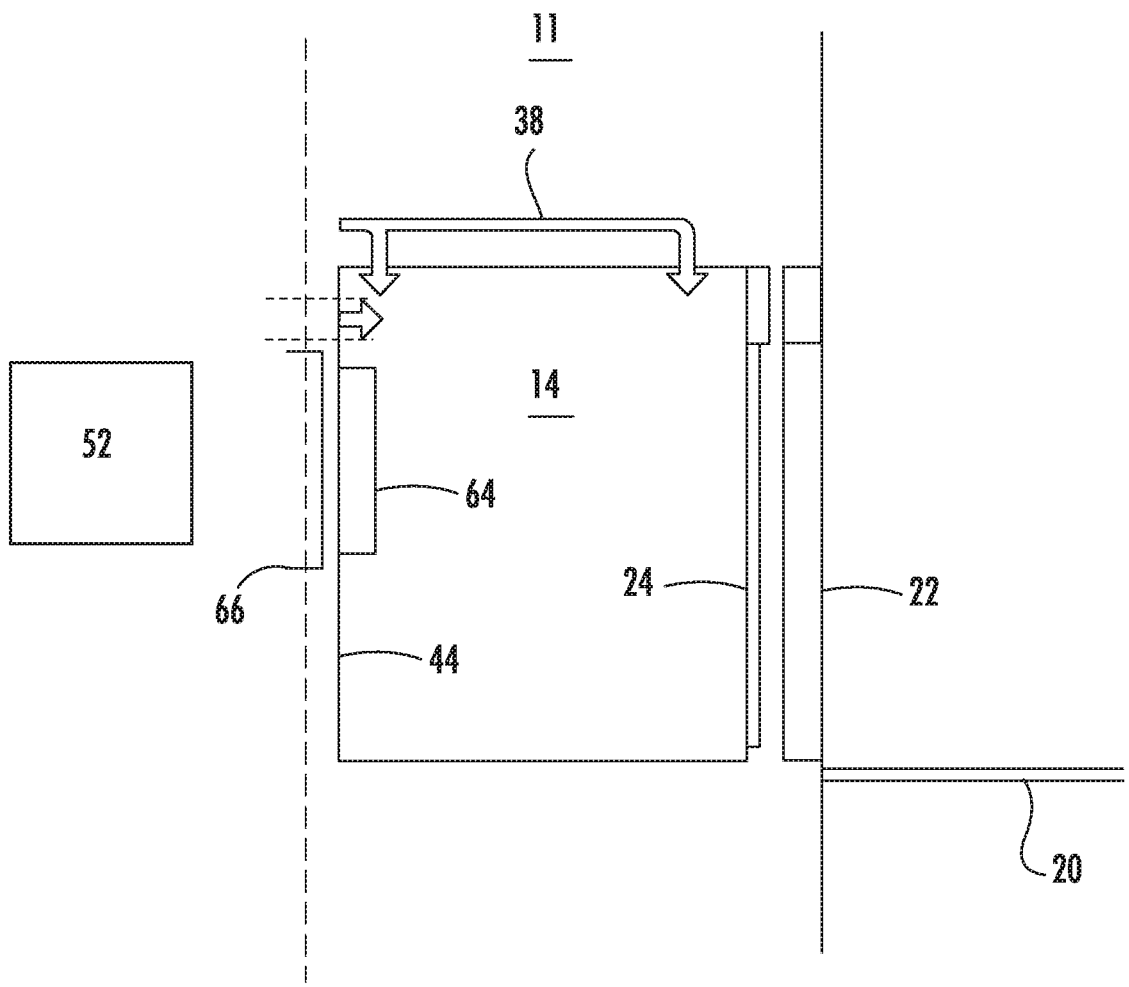
FIG. 3 depicts another embodiment of an elevator car for an elevator system.

Further, in a typical elevator system, ventilation unit or fan requiring electrical power is located at the elevator car. To reduce elevator car 14 weight, the elevator car 14 does not include an electrically-powered ventilation system. As shown in FIG. 2, in one embodiment, ventilation system 52 is located at the hoistway 11, with a blower 54 and/or air outlet 56 located at a landing floor 22. In some embodiments, the ventilation system includes an air conditioner to provide cooled and/or heated air to the car 14. Air outlets 56 may be located at all landing floors 22 or only at select landing floors 22, such as a lobby floor. When stopped at the landing floor 22, the air outlet 56 aligns with a car air inlet 58 located at, for example, the sidewall 44 of the car 14, and may include a screen, grate or diffuser over the car air inlet 58. When presence of the car 14 is sensed at the landing floor 22, conditioned and/or fresh airflow 62 is urged from the air outlet 56 and through the car air inlet 58 into an interior of the car 14 to condition the space. In another exemplary embodiment, shown in FIG. 3, a volume of phase change material 64 is located at the sidewall 44. When the elevator car 14 stops at a landing floor 22 a cold plate 66 in the hoistway 11 cooled by the ventilation system 52 abuts the phase change material 64. The cold plate 66 and phase change material 64 exchange thermal energy to cool or charge the phase change material 64, which in turn exchanges thermal energy with the air in the elevator car 14 to cool the elevator car 14.

The elevator car 14 and elevator system 10 described herein result in significant weight decrease on the car 14, compared to cars of traditional elevator systems, and thus significantly saving weight and cost of the propulsion system for the ropeless elevator system. These configurations also improve elevator system reliability, since these systems are hard wired in the hoistway, and do not rely on a traveling cable or batteries for operation, and do not rely on wireless communications to operate them.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An elevator system comprising:
   a hoistway;
   an elevator car disposed in the hoistway and configured to travel along the hoistway, the elevator car including an elevator car door; and
   a door operator assembly fixed in the hoistway at a landing floor, including:
      a sensor to sense presence of the elevator car at the landing floor; and
      a door operator mechanism to open both the elevator car door and a landing floor door when the sensor senses presence of the elevator car at the landing floor;
   a light source fixed at the hoistway; and
   a light transmitter disposed at the elevator car to gather light from the light source and output the light into an interior of the elevator car;
   wherein the light transmitter is a light pipe including:
      a light pipe inlet disposed proximate to the light source; and
      a light pipe outlet disposed at the elevator car to output light into the interior of the elevator car.

2. The elevator system of claim 1, wherein the sensor is a radio frequency identification or optical sensor.

3. The elevator system of claim 1, wherein the door operator is inoperable when the sensor does not sense the presence of the elevator car at the landing floor.

4. The elevator system of claim 1, wherein the light source is one or more light emitting diodes arranged along the hoistway.

5. The elevator system of claim 1, further comprising ventilation system fixed at the hoistway operably connected with the elevator car to condition an interior of the elevator car.

6. The elevator system of claim 5, wherein the ventilation system includes an air outlet in flow communication with a car air inlet to urge a conditioned airflow from the ventilation system into the elevator car via the car air inlet.

7. The elevator system of claim 6, wherein the air outlet is disposed at a landing floor.

8. The elevator system of claim 1, wherein the elevator system is a ropeless elevator system.

* * * * *